United States Patent Office 3,728,225
Patented Apr. 17, 1973

3,728,225
PROCESS FOR INCUBATING SALMONELLA
Robert John Kuncic, Summit, Ill., assignor to
CPC International Inc.
No Drawing. Filed May 28, 1970, Ser. No. 41,645
Int. Cl. C12k 1/06
U.S. Cl. 195—96    6 Claims

ABSTRACT OF THE DISCLOSURE

A preenrichment medium for Enterobacteriaceae which comprises sterilized corn steepwater having a pH of from about 6.0 to about 9.0 and a solids content of from about 5 to about 60 grams per liter. Also disclosed in a method of incubating Enterobacteriaceae by utilizing the aforementioned media.

---

This invention relates to culture media for microorganisms and more particularly relates to preenrichment media for the Enterobacteriaceae.

The presence of bacteria in foods has been of increasing concern to both the food industry and public health officials. Bacteria of the Enterobacteriaceae family in general and those of the genus Salmonella in particular have been the cause of increasing cases of food poisonings. The presence of Salmonella has been found in a variety of foods, and animals such as domestic fowl, are considered the greatest single reservoir of Salmonella. A significant increase, however, in the prevalence of Salmonella in large meat animals, such as cattle and swine, has also been found.

In order to detect and prove the existence of Salmonella, for example, in materials such as foods used for human consumption or in animal feeds, it is necessary to isolate the organism in a relatively pure culture from the numerous other microorganisms which are typically present in such materials. This isolation of Salmonella in most food products other than meats and feeds is usually accomplished by first incubating the material in question in a preenrichment medium wherein the Salmonella in the sample can grow to a sufficient extent so that they can be subjected to a second and selective enrichment medium which will allow continued growth of Salmonella while suppressing the growth of most other organisms. Since the selectivity of enrichment media in allowing Salmonella to grow while inhibiting the growth of most others is not an absolute selectivity but only a selectivity in degree, wherein such a media is less toxic to Salmonella, it is necessary to first establish a healthy and growing culture of the organism to be isolated. It is the purpose of the preenrichment media to accomplish this result.

It has now been found that a preenrichment media suitable for incubating Enterobacteriaceae can be prepared from corn steepwater without requiring the addition of any other nutrients. Furthermore, it has been found that the preenrichment media prepared from corn steepwater as hereinafter described in particularly suitable for incubating Enterobacteriaceae of the genus Salmonella.

One embodiment of the present invention resides in a preenrichment medium which comprises sterilized corn steepwater having a pH of from about 6.0 to about 9.0, and a solids content of from about 5 to about 60 grams per liter.

Another embodiment of the present invention resides in a method of incubating Enterobacteriaceae which comprises inoculating a preenrichment medium of the above description.

In a preferred embodiment of the present invention the preenrichment media comprises sterilized corn steepwater having a pH of from about 6.0 to about 9.0, a solids content of from about 5 to about 60 grams per liter, and having undergone a lactic acid bacterial fermentation.

The corn steepwater which can be used to prepare the preenrichment media of this invention can comprise any of the corn steepwaters which are obtained from the process of wet milling of corn. Typically, this steepwater is obtained by soaking corn for a period of about 24 to about 96 hours in warm water which has been slightly acidified with sulphur dioxide.

The preenrichment media of the present invention are prepared from corn steepwater by adjusting the solids content of the steepwater, adjusting the pH of the steepwater and sterilizing the steepwater.

The steepwater obtained directly from the wet milling process of corn is first subjected to a lactic acid fermentation to prepare the preferred preenrichment media of the present invention. This lactic acid fermentation comprises incubating the corn steepwater for a period of from about 12 to about 48 hours at mesophilic temperatures such as from about 20 to about 45° C.

Upon completion of the lactic acid fermentation the steepwater can be concentrated by evaporating the water until the solids content has attained the required concentration. While the preenrichment media of the present invention require a solids content ranging from about 5 to about 60 grams per liter, it can be preferred, in some instances, to concentrate the steepwater obtained from the lactic acid fermentation to a much higher solids content, such as up to about 70% by weight, and thereafter rediluting, neutralizing and sterilizing it to the specified solids content at a convenient time prior to use. Such a procedure can result in space saving and in a reduction in shipping costs of the preenrichment media of this invention. A particularly useful solids concentration of the steepwater which has been subjected to the lactic acid fermentation can range from about 45 to about 60% by weight.

As previously indicated, the pH of corn steepwater must be adjusted to within a certain range to result in the preenrichment media of this invention. The pH range required is from about 6.0 to about 9.0 and a preferred range is from about 6.5 to about 7.5. Since corn is usually soaked or steeped in water to which sulphur dioxide has been added and undergoes a lactic acid bacterial fermentation, the resulting steepwater is acidic. Thus, a base can be added to the steepwater to bring its pH to within the range set forth above. Typical bases useful for this purpose are alkali metal hydroxides or carbonates such as sodium hydroxide, potassium hydroxide, sodium carbonate, potassium carbonate, sodium bicarbonate and the like.

The final step in preparing the preenrichment media of this invention comprises sterilizing the product of the above described procedures. The sterilization can be performed by standard methods in the art such as autoclaving and the like.

The preenrichment media and the method of their preparation is more specifically illustrated in the following examples:

EXAMPLE I

Corn steepwater obtained directly as a by-product of a corn wet milling process was subjected to a lactic acid bacterial fermentation at a temperature of 115° F. to 125° F. for a period of about 24 hours. This steepwater was then concentrated to a solids content of about 55% by weight. The concentrate is diluted with distilled water to a broth with a solids content of 35 grams per liter, and the pH of the steepwater was adjusted to a range of between 7.0 and 7.5 using sodium hydroxide. After this time, the steepwater was autoclaved at 121° C. for a period of 15 minutes to yield a preenrichment media of this invention.

EXAMPLE II

Corn steepwater obtained directly as a by-product of a corn wet milling process is subjected to a lactic acid bacterial fermentation at a temperature of from about 50° F. for a period of about 48 hours. After this time, the lactic acid fermentation product is concentrated by evaporating the water to a solids content of about 40% solids. The concentrate is diluted with distilled water to a broth with a solids content of 5 grams per liter. The pH of the steepwater is then adjusted with potassium carbonate to a pH ranging from about 6.0 to about 6.5 and is thereafter autoclaved at a temperature of about 121° C. for a period of about 20 minutes to yield a preenrichment medium of this invention.

EXAMPLE III

Corn steepwater obtained directly as a by-product of a corn wet milling process is subjected to a lactic acid bacterial fermentation at a temperature of about 130° F. for a period of about 1 to 48 hours. After this time, the steepwater is concentrated to a solids content of about 60% solids. The concentrated steepwater is then diluted with distilled water to about 60 grams per liter broth solids content, and treated with sodium carbonate to adjust the pH to a range of from about 7.5 to about 9.0. The resulting product is then autoclaved at a temperature of about 121° C. for a period of about 20 minutes to yield a preenrichment medium of the present invention.

The effectiveness of the preenrichment media of this invention was demonstrated in experiments wherein six serotypes of Salmonella were grown in the media. These serotypes were: S. gallinarium, S. paratyphi A, S. choleraesuis, S. typhimurium, S. newport and an $E_4$-G complex. In these experiments all of the strains, with the exception of S. gallinarium, showed profuse reproduction in 24 hours at 37° C.

The effectiveness of the preenrichment media of this invention was further demonstrated in experiments wherein a quantitative growth rate of a variety of commonly isolated serotypes of Salmonella in a preenrichment medium of this invention was established. A comparison of a preenrichment medium of the present invention with three standard broths was also made. In this experiment, samples of food starch were inoculated with various concentrations of the common varieties of Salmonella to obtain a cell density of 1, 3, 6 and 8 cells per 100 grams of starch. The starch materials were hydrated with the various preenrichment media and were incubated for a period of 24 hours at a temperature of 35° C. Following incubation, the cultures were transferred into selective media of selenite crystine broth and tetrathionate broth. The results of these experiments are shown in Table 1.

TABLE 1

| | Salmonella density, cells/100 gr. of starch | Total bacterial assay of starch, cells/1 gr. | No. of replicate samples | Average Salmonella recovery percentage |
|---|---|---|---|---|
| Product of Example 1 | 1 | 1,000 | 20 | 10 |
| Standard broth [1] | 1 | 1,000 | 20 | 10 |
| Product of Example 1 | 3 | 2,000 | 4 | 75 |
| Standard broth | 3 | 2,000 | 12 | 75 |
| Product of Example 1 | 6 | 2,000 | 20 | 60 |
| Standard broth | 6 | 2,000 | 20 | 60 |
| Product of Example 1 | 8 | 40 | 22 | 99 |
| Standard broth | 8 | 40 | 12 | 70 |

[1] The standard broths used in this experiment were lactose broth, mannitol broth and nutrient broth.

It can be seen from the average percentage of Salmonella recovery, which represents the percentage of samples from which Salmonella was recovered from the selective enrichment media, that the preenrichment media of the present invention are as effective as the standard broths used by the microbiology profession from the media industry and in one instance is more effective than these standard broths.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

The invention is hereby claimed as follows.

I claim:

1. A process for incubating Salmonella which comprises
   (a) inoculating a preenrichment medium comprising sterilized corn steepwater having a pH from about 6.0 to about 9.0 and a solids content of from about 5 to about 60 grams per liter with samples containing Salmonella, and
   (b) subjecting the resulting mixture to incubating conditions.

2. The process of claim 1 where the corn steep liquor has a pH of from about 6.5 to about 7.5.

3. The process of claim 1 where the corn steep liquor has a solids content of from about 10 to about 40 grams per liter.

4. A process for incubating Salmonella which comprises
   (a) inoculating a preenrichment medium comprising sterilized corn steep liquor, having a pH from about 6.0 to about 8.0, a solids content of from about 5 to about 60 grams per liter, and having undergone a lactic acid fermentation, with samples containing Salmonella, and
   (b) subjecting the resulting mixture to incubating conditions.

5. The process of claim 4 where the corn steep liquor has a pH of from about 6.5 to about 7.5.

6. The process of claim 4 where the corn steep liquor has a solids content of from about 10 to about 40 grams per liter.

References Cited

UNITED STATES PATENTS

| 2,515,157 | 7/1950 | Parsons | 195—100 |
| 2,576,513 | 11/1951 | Bennett | 195—100 |
| 3,401,088 | 9/1968 | Villax | 195—100 |
| 2,797,187 | 6/1957 | Szumski et al. | 195—100 |

OTHER REFERENCES

Journal of Bacteriology, vol. 65, pp. 361–367 (1953).

ALVIN E. TANENHOLTZ, Primary Examiner

U.S. Cl. X.R.

195—100